United States Patent [19]
Kametani

[11] 3,898,215
[45] Aug. 5, 1975

[54] RESCINNAMINE-LIKE COMPOUNDS AND A PROCESS FOR PRODUCING THE SAME

[75] Inventor: Tetsuji Kametani, Sendai, Japan

[73] Assignee: Nippon Chemiphar Co., Ltd., Tokyo, Japan

[22] Filed: Apr. 19, 1972

[21] Appl. No.: 245,652

[30] Foreign Application Priority Data
Oct. 8, 1971 Japan.............................. 46-78781
Oct. 8, 1971 Japan.............................. 46-78782
Dec. 28, 1971 Japan............................ 46-105685

[52] U.S. Cl......... 260/240 AL; 424/262; 260/287 A
[51] Int. Cl............................................. C07d 33/00
[58] Field of Search ................. 260/240 AL, 287 A

[56] References Cited
UNITED STATES PATENTS
3,109,003 10/1963 Szmuszkovicz et al. ......... 260/287 A
3,126,387 3/1964 Robison et al. ................... 260/287 A
3,702,325 11/1972 Fellion........................... 260/240 AL FOREIGN PATENTS OR APPLICATIONS
1,401,524 4/1965 France.......................... 260/240 AL OTHER PUBLICATIONS
Pelletier, Chemistry of the Alkaloids, frontispage and page 221, Van Nostrand Reinhold Co., Copyright 1970.
Klohs, et al., J. Am. Chem. Soc., Vol. 76, p. 2843, (1954).

*Primary Examiner*—John D. Randolph
*Attorney, Agent, or Firm*—Oblon, Fisher, Spivak, McClelland & Maier

[57] ABSTRACT

Rescinnamine-like compounds represented by the following formula:

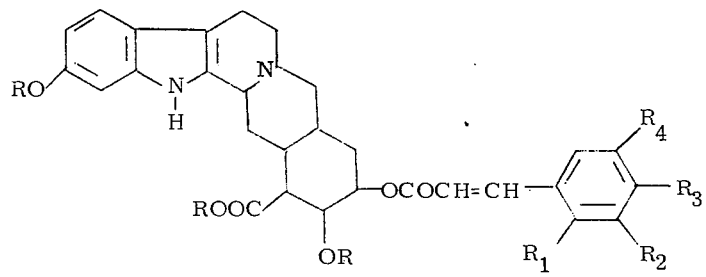

wherein R represents a lower alkyl group; $R_1$ represents a hydrogen atom or a nitro group; $R_2$ and $R_3$ represent a hydrogen atom, a hydroxy, lower alkoxy, aralkyloxy or alkoxycarboxy group; $R_4$ represents a hydrogen atom or a lower alkoxy group; with the proviso that if $R_1$ to $R_4$ are not all hydrogen atoms, or if $R_1$ is not a hydrogen atom and $R_2$ to $R_4$ are not all lower alkoxy groups, then $R_2$ and $R_3$ or $R_3$ and $R_4$ may jointly form an alkylenedioxy group; are prepared by hydrolyzing reserpine, or a derivative thereof, selectively at the 18-position, to form alkylreserpate or a derivative thereof and then reacting said product with cinnamic acid.

4 Claims, No Drawings

RESCINNAMINE-LIKE COMPOUNDS AND A PROCESS FOR PRODUCING THE SAME

BACKGROUND OF THE INVENTION

1. Field of the Invention

This invention relates to novel rescinnamine-like compounds and to an industrially acceptable process for producing the same. This invention further relates to a process for producing an intermediate compound which is useful in the preparation of said rescinnamine-like compounds.

2. Description of the Prior Art

Heretofore, it has been known that rescinnamine, extracted from Rauwolfia serpentina Benth, has a hypotensive effect similar to that of reserpine. Although its sedative effect is weaker, its effect in enhancing myocardial contraction is stronger, and it has fewer contraindications, such as depression or rhinostenosis than reserpine.

Heretofore, alkylreserpate or derivatives thereof, have been produced by simultaneously hydrolyzing a reserpine or a derivative thereof at its 16- and 18-position, and then methylating the obtained product at its 16- position with diazomethane. It has also been reported that such compositions can be obtained by methanolyzing a reserpine or a derivative thereof at the 18-position using methanol as a solvent. However, neither of these prior art processes have been sufficient to achieve industrial acceptance.

SUMMARY OF THE INVENTION

It is, therefore, one object of this invention to provide a rescinnamine-like compound which is characterized by superior hypotensive effect.

It is another object of this invention to provide an industrial process for advantageously producing said rescinnamine-like compounds.

It is a further object of this invention to provide an industrial process for advantageously producing alkylreserpate or a derivative thereof which is useful as an intermediate in the production of rescinnamine-like compounds.

These and other objects, as will hereinafter become more readily apparent, have been attained by the discovery of compounds having the formula (I):

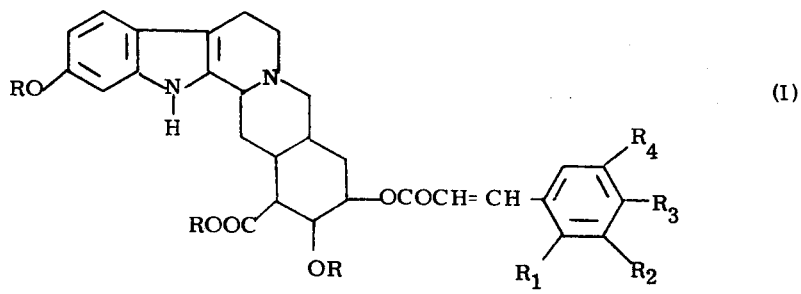

(I)

wherein R represents a lower alkyl group; $R_1$ represents a hydrogen atom or a nitro group; $R_2$ and $R_3$ represent hydrogen, hydroxy, lower alkoxy, aralkyloxy or alkoxycarboxy; $R_4$ represents hydrogen or lower alkoxy; or $R_2$ and $R_3$ or $R_3$ and $R_4$ may jointly form an alkylenedioxy group; except when $R_1$ to $R_4$ are all hydrogen atoms or $R_1$ is a hydrogen atom and $R_2$ to $R_4$ are all lower alkoxy groups.

According to the present invention, rescinnamine-like compounds are produced as follows:

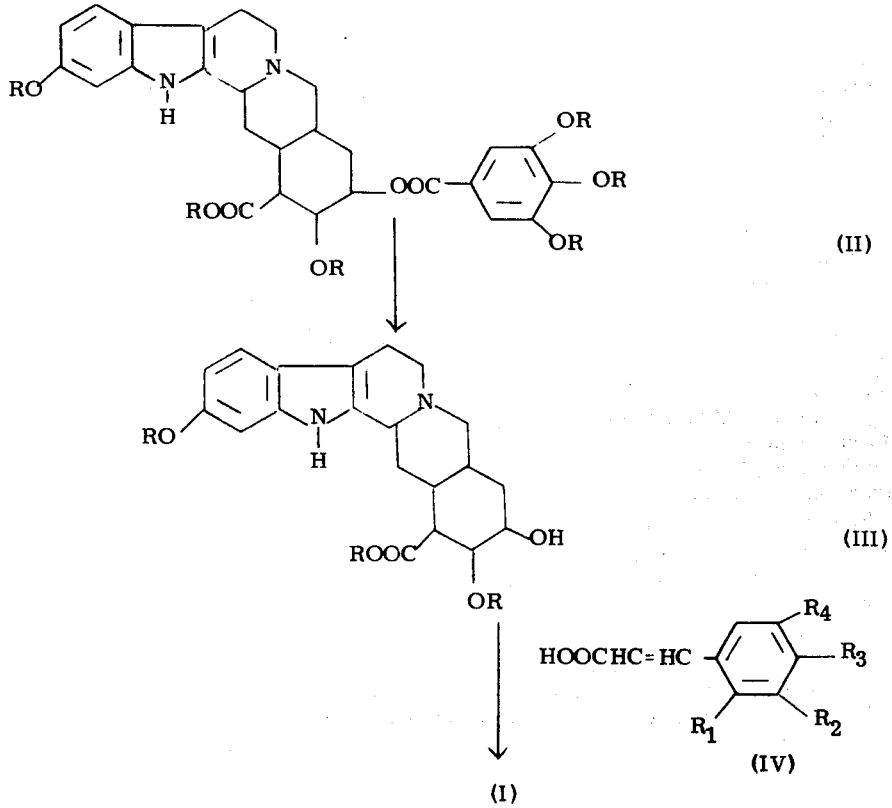

wherein the symbols are the same as heretofore defined.

That is, the present invention provides a process for producing rescinnamine-like compounds of the formula (I) which comprises treating the reserpine or a derivative thereof of the formula (II) with an alkaline reagent, in the presence of a mixed solvent containing a lower alcohol and cyclic ether, to cause selective hydrolysis at the 18-position, to form an alkylreserpate or a derivative thereof, of the formula (III), then reacting that compound with a cinnamic acid of the formula (IV) or a reactive derivative thereof.

DETAILED DESCRIPTION OF THE INVENTION

It has now been found that when the reserpine or its derivatives are treated by alkaline reagent in the presence of mixed solvents of lower alcohol and cyclic ether, the 18-position thereof are only hydrolyzed advantageously selectively to obtain the alkyl reserpate or its derivatives.

In carrying out the process of the present invention, metallic sodium, metallic potassium, or the like is dissolved in a lower alcohol, such as methanol or ethanol, and water and cyclic ether, such as dioxane or tetrahydrofuran, etc. is added thereto. Then, the reserpine or a derivative thereof is added to the mixture and reacted. The reaction is preferably conducted at room temperature by stirring for 20 to 30 hours, but the reaction may be conducted by heating under reflux for 2 to 5 hours.

When thus reacted, the reserpine, or the derivative thereof, is selectively hydrolyzed at its 18-position to provide an alkylreserpate or a derivative thereof. This alkylreserpate or derivative is dissolved in a solvent such as pyridine, etc., and a cinnamic acid or a reactive derivative thereof of the formula (IV), is added thereto and reacted. Although the reaction is conducted at room temperature, the reaction may be accelerated by application of heat. The reactants are stirred and the reaction reaches completion within 20 to 30 hours.

Suitable reactive derivatives of cinnamic acid which may be used in this reaction include the acid halides, mixed anhydrides, active esters or anhydrides.

When the reactive solution thus obtained is poured, for example, into ice water, and is acidified with acid such as dilute hydrochloric acid, etc., and isolated by conventional refining procedures, rescinnaminelike compounds are produced.

Alternatively, the compounds represented by $R_2$ or $R_3$ may be a hydroxy group in the formula (I), produced by hydrolyzing the corresponding lower alkoxycarboxy substituted compound.

This hydrolysis can be conducted as follows: Metallic sodium is dissolved in a lower alcohol such as, for example, methanol or ethanol, and water and an organic solvent, such as dioxane, tetrahydrofuran, etc. is added thereto. The corresponding lower alkoxycarboxy substituted compound is added to the mixture, and the mixture is stirred at room temperature, or is heated for approximately 2 hours. The resulting hydroxyl substituted compounds may be isolated or refined by normal procedures.

The hypotensive effect of the rescinnamine-like compounds was compared with rescinnamine by cannulation in unanesthetized, spontaneously hypertensive rats. After intravenous injection of the compounds to 3 rats in one group, the ratio of hypotensive effect for 5 hours was calculated as $ED_{20}$. The $ED_{20}$ value was calculated by a dose-response regression line. The effect of the rescinnamine-like compound in decreasing systemic blood pressure is shown in the following Table I:

TABLE I

| Compounds | $ED_{20}$ (mg/kg) | Relative Activity Calculated by $ED_{20}$ (Rescinnamine = 1.00) |
|---|---|---|
| Methylreserpate 3',4'-dimethyoxycinnamate | 1.0 | 1.40 |
| Methylreserpate 3'-methoxy-4'-ethoxycinnamate | 1.6 | 0.86 |
| Methylreserpate 2'-nitro-3',4', 5'-trimethoxycinnamate | 1.0 | 1.40 |
| Methylreserpate 3'-ethoxycarboxy-4'-methoxycinnamate | 2.5 | 0.56 |
| Methylreserpate 3'-methoxy-4'-ethoxycarboxycinnamate | 1.5 | 0.94 |
| Methylreserpate 3'-hydroxy-4'-methoxycinnamate | 2.1 | 0.67 |
| Methylreserpate 3'-methoxy-4'-hydroxycinnamate | 0.8 | 1.75 |
| Rescinnamine | 1.4 | 1.00 |

Having generally described the invention, a further understanding can be obtained by reference to certain specific Examples which are provided herein for purposes of illustration only and are not intended to be construed as limiting unless otherwise specified.

EXAMPLE 1

0.34 g. of metal sodium was dissolved in 300 ml. of anhydrous methanol, 0.27 g. of water and 150 ml. of tetrahydrofuran were added thereto, and 5 g. of reserpine hydrochloride was further added thereto. After the mixture was stirred at room temperature for one day, the solvent was evaporated. When the residue was dissolved in chloroform, washed with aqueous solution of saturated sodium bicarbonate, and then with water, dried over sodium sulfate and the solvent was evaporated therefrom, there was obtained a pale yellow solid. When this was recrystallized from methanol, there was obtained 2.87 g. (93% of yield) of methylreserpate as colorless needles having a melting point of 233° to 239°C.

EXAMPLE 2

2 g. of 3,4-dimethoxycinnamic acid was suspended in 20 ml. of benzene, 2 ml. of thionyl chloride was added thereto, and the mixture was heated under reflux on a water bath for 3 hours. Then, when the excessive thionyl chloride and benzene were evaporated under reduced pressure, there was obtained a colorless solid of the corresponding cinnamoyl chloride.

After this cinnamoyl chloride was dissolved in 30 ml.

conditions except that chloroform-hexane was used as the solvent of recrystallization, and there was obtained 0.56 g. (75% of yield) of methylreserpate 3'-methoxy-4'-ethoxycinnamate, represented by the following formula and characterized as a pale yellow powder having a melting point of 140° to 141°C.:

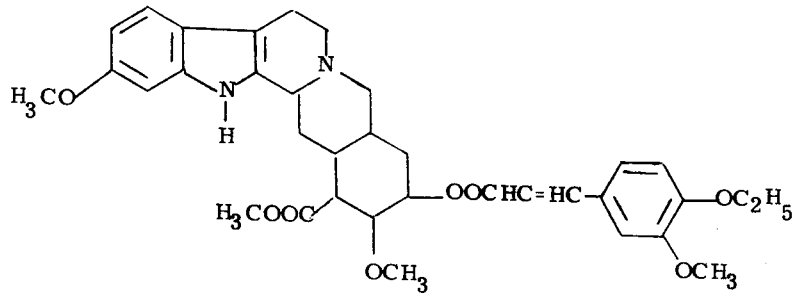

of benzene, this mixture was added to a solution of 1 g. of methylreserpate in 30 ml. of pyridine, and the mixture was allowed to stand at room temperature for one day while being occasionally stirred. The mixture was poured into 100 ml. of ice water. Then, the mixture was made acidic with dilute hydrochloric acid, and extracted with chloroform. The chloroform layer was washed with saturated sodium bicarbonate, dried over sodium sulfate, and evaporated to obtain a brown amorphous matter. After this was stimulated with ether, it was recrystallized from benzenehexane, and there was obtained 0.81 g. (55% of yield) of methylreserpate 3',4'-dimethoxycinnamate, represented by the following formula, which was characterized as a pale yellow powder, having a melting point of 180° to 181°C.

EXAMPLE 4

Using 1.2 g of methylreserpate and cinnamoyl chloride, produced by the procedure of Example 2, under the same reaction conditions, from 2 g. of 2-nitro-3,4,5-trimethoxycinnamic acid, the same procedure of Example 2 was repeated under the same reaction conditions, and there was then obtained 1.5 g. (87% of yield) of methylreserpate 2'-nitro-3',4',5'-trimethoxycinnamate represented by the following formula which was characterized as a pale yellow powder having a melting point of 141° to 143°C.:

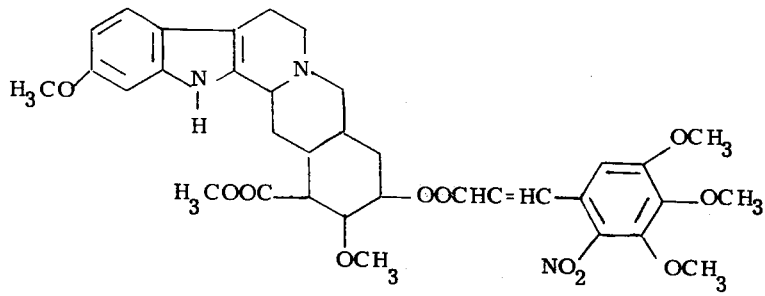

EXAMPLE 5

Using 1.8 g. of methylreserpate and cinnamoyl chloride produced by the procedure of Example 2 under the same reaction conditions, from 2 g. of 3-ethoxycarboxy-4-methoxycinnamic acid, the same procedure of Example 2 was repeated under the same reaction conditions, and there was then obtained 1.6 g. (75% of yield) of methylreserpate 3'-ethoxycarboxy-4'-methoxycinnamate represented by the following formula which was characterized as a pale yellow powder having a melting point of 119° to 121°C.:

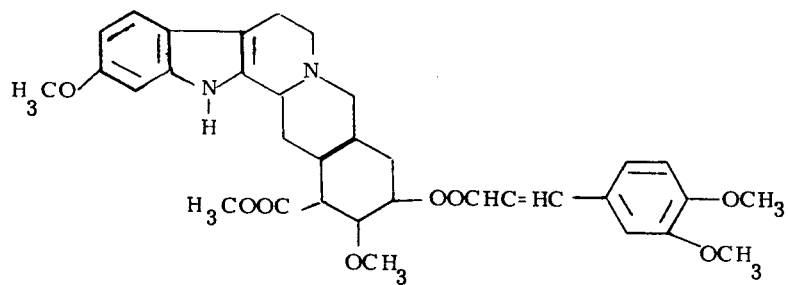

EXAMPLE 3

Using 0.5 g. of methylreserpate and cinnamoyl chloride, produced by the procedure of Example 2, under the same reaction conditions, from 1.5 g. of 3-methoxy-4-ethoxycinnamic acid, the same procedure of Example 2 was repeated under the same reaction

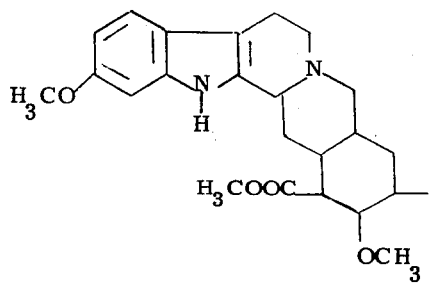
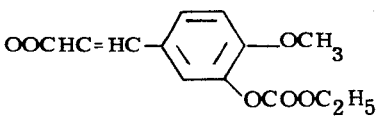

EXAMPLE 6

Using 1.5 g. of methylreserpate and cinnamoyl chloride produced by the procedure of Example 2 repeated under the same reaction conditions from 3 g. of 3-methoxy-4-ethoxycarboxycinnamic acid, the same procedure of Example 2 was repeated under the same reaction conditions, and there was then obtained 1.0 g. (74% of yield) of methylreserpate 3'-methoxy-4'-ethoxycarboxycinnamate represented by the following formula which was characterized as a pale yellow powder having a melting point of 128° to 130°C.:

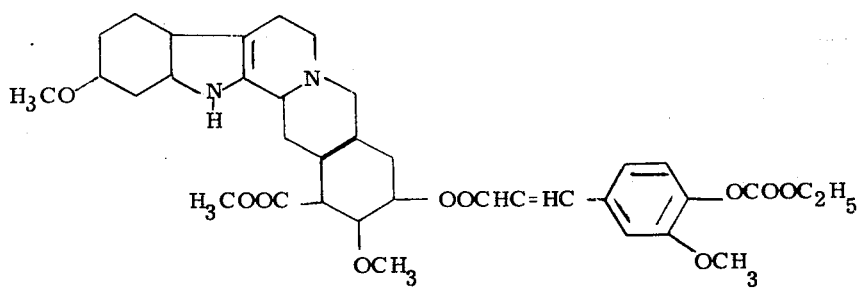

EXAMPLE 7

2 g. of 3,4-methylenedioxycinnamic acid was suspended in 30 ml. of benzene, 2 ml. of thionyl chloride was added thereto, and the mixture was heated under reflux in a water bath for 3 hours. The excessive thionyl chloride and benzene were evaporated under reduced pressure, and hexane was added thereto. The mixture was then again evaporated, and there was obtained a white solid identified as 3,4-methylenedioxycinnamoyl chloride.

Cinnamic chloride was then dissolved in 30 ml. of benzene, and a solution of 2 g. of methylreserpate in 30 ml. of pyridine was added thereto. The mixture was allowed to stand at room temperature for one day while being occasionally stirred. The mixture was then poured into 100 ml. of ice water. After the mixture was made acidic with dilute hydrochloric acid, and extracted with chloroform, the extract was washed with saturated sodium bicarbonate and then with water, and dried over sodium sulfate. The solvent was evaporated, and there was obtained a brown amorphous matter. It was then recrystallized with chloroform-hexane, so that there was obtained 0.77 g. (54% of yield) of methylreserpate 3',4'-methylenedioxycinnamate represented by the following formula, which was characterized as a grey powder having a melting point of 210° to 210.5°C.:

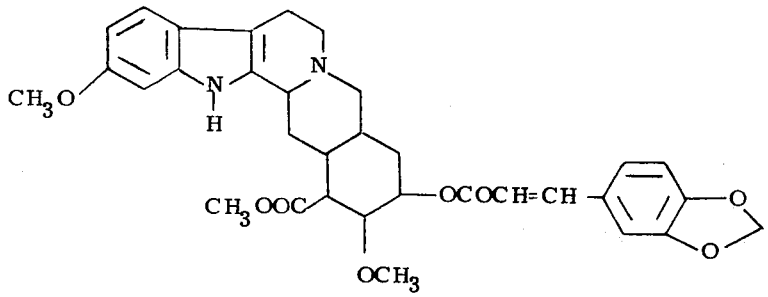

Elemental Analysis: as $C_{29}H_{26}O_8N_2$

|  | C | H | N |
|---|---|---|---|
| Calculated (%) | 67.35 | 6.12 | 4.76 |
| Found (%) | 67.65 | 6.34 | 4.61 |

IR CHCl$_3$
$\nu$max cm$^{-1}$
3425 (Indole NH),
1700 (COO)
1630 (C = C)

NMR (CDCl$_3$)τ
2.35 (1H, d, J = 16Hz, CH = C$\underline{H}$ - Ar)
3.72 (1H, d, J =16Hz, C$\underline{H}$ = CH - Ar)
3.99 (2H, s, methylenedioxy)
5.52 (1H, m, 3 - H)
6.17 (6H, s, 2 X OCH$_3$)
6.49 (3H, s, 17-OCH$_3$)

EXAMPLE 8

Using 1.3 g. of methylreserpate and cinnamoyl chloride, produced by the procedure of Example 7, under the same reaction conditions, from 2 g. of 6-nitro-3,4-methylenedioxycinnamic acid, the same procedure of Example 7 was repeated under the same reaction conditions. 1.42 g. (71% of yield) of methylreserpate 6'-nitro-3', 4'-methylenedioxycinnamate, represented by the following formula, was obtained, which was characterized as a grey powder having a melting point of 213° to 214°C. (decomposition).

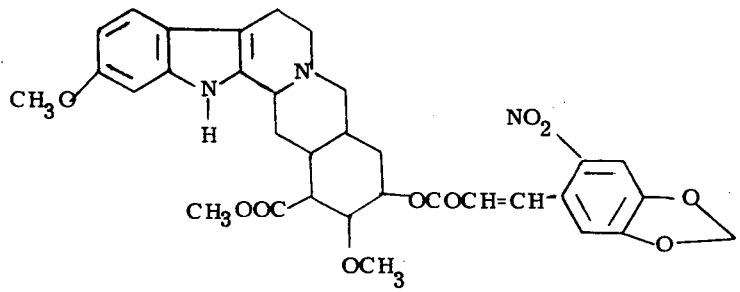

Elemental Analysis: as $C_{33}H_{35}O_{10}N_3$

|  | C | H | N |
|---|---|---|---|
| Calculated (%) | 62.56 | 5.53 | 6.64 |
| Found (%): | 62.60 | 5.17 | 6.56 |

IR $\nu$max $CHCl_3$ cm$^{-1}$
3425 (Indole NH)
1715 (COO)
1628 (C = C)
1570 and 1330 (C - NO$_2$)

NMR (CDCl$_3$ + slight DMSO - d$_6$)τ
0.32 (1H, m, indole NH)
1.74 (1H, d, J = 16Hz CH = CH - Ar)
3.68 (1H, d, J = 16Hz, CH = CH -Ar)
3.78 (2H, s, methylenedioxy)
5.55 (1H, m, 3 - H)
6.15 (6H, s, 2 X OCH$_3$)
6.44 (3H, s, 17 - OCH$_3$)

EXAMPLE 9

2 g. of 3-benzyloxy-4-methoxycinnamic acid obtained by reacting 3-benzyloxy-4-methoxybenzaldehyde with malonic acid was reacted with thionyl chloride under the same reaction conditions as in Example 7 to obtain the corresponding cinnamoyl chloride. The thus obtained cinnamoyl chloride was reacted with 1.46 g. of methylreserpate under the same reaction conditions as in Example 7, and the product was chromatographed over neutral alumina, and eluted with chloroform-benzene (1 : 1). The elute was evaporated and the residue was recrystallized from chloroform-hexane and there was obtained 1.39 g. (58%) of methylreserpate 3'-benzyloxy-4'-methoxycinnamate represented by the following formula, which was characterized as pale yellow needles having a melting point of 170° to 171.5°C. (decomposition):

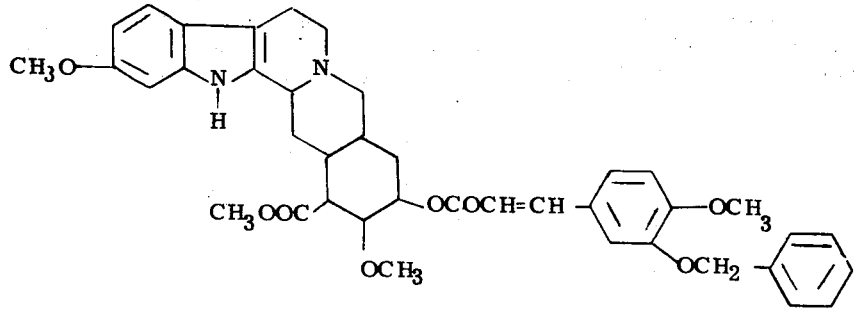

Elemental Analysis: as $C_{40}H_{44}O_8N_2$

|  | C | H | N |
|---|---|---|---|
| Calculated (%) | 70.59 | 6.47 | 4.12 |
| Found (%) | 70.59 | 6.20 | 4.26 |

IR $\nu$max. $CHCl_3$ cm$^{-1}$ 3425 (Indole NH)

1710 (COO)

1630 ( C = C )

—Continued 1600 ( —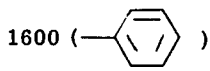 )

NMR (CDCl$_3$) τ

2.40 (1H, d, J = 16 Hz, CH = C$\underline{H}$ - Ar)

2.62 ( 5H, 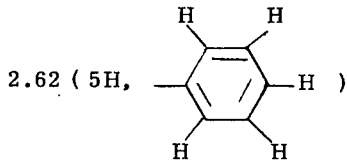 )

3.77 (1H, d, J = 16 Hz, C$\underline{H}$ = CH - Ar)

4.88 (2H, s, OCH$_2$—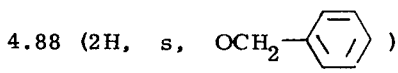 )

5.62 (1H, m, 3- H)

6.12 (3H, s, OCH$_3$)

6.22 (6H, s, 2 X OCH$_3$)

6.50 (3H, s, 17 - OCH$_3$)

EXAMPLE 10

2 g. of 2-nitro-4-benzyloxy-3,5-dimethoxycinnamic acid, obtained by reacting 2-nitro-4-benzyloxy-3,5-dimethoxybenzaldehyde with malonic acid, was reacted with thionyl chloride under the same reaction conditions as in Example 7 to obtain the corresponding cinnamoyl chloride. The thus obtained cinnamoyl chloride was reacted with 0.64 g. of methylreserpate under the same reaction conditions as in Example 7, and the product was chromatographed over neutral alumina, and eluted with chloroform-benzene, (1 : 1). The elute was evaporated and the residue was recrystallized from chloroformhexane so that there was obtained 0.96 g. (82% of yield) of methylreserpate 2'-nitro-4'-benzyloxy-3',5'-dimethoxycinnamate represented by the following formula, which was characterized as a brown powder having a melting point of 130° to 131.5°C.:

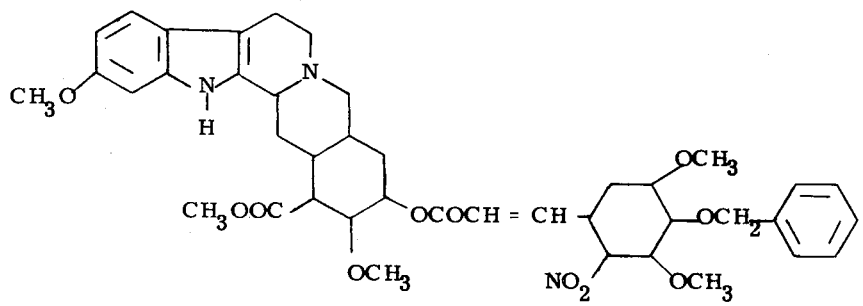

Elemental Analysis:   as C$_{41}$H$_{45}$O$_{11}$N$_3$

|  | C | H | N |
|---|---|---|---|
| Calculated (%) | 65.17 | 5.96 | 5.56 |
| Found (%) | 64.93 | 6.01 | 5.52 |

IR  $\overset{CHCl_3}{}$ cm$^{-1}$ $\nu$ max.

3420 (Indole NH)

1710 (COO)

1630 (C=C)

1570 and 1350 (C-NO$_2$)

NMR (CDCl$_3$) $\tau$ 2.18 (1H, d, CH=C$\underline{H}$-Ar)

2.58 (5H, 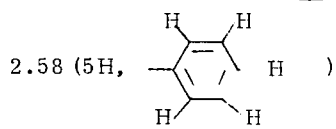 )

3.62 (1H, d, C$\underline{H}$=CH-Ar)

4.90 (2H, s, OC$\underline{H}_2$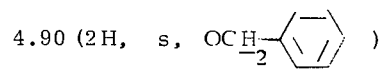 )

5.65 (1H, m, 3-H)

6.07 (6H, s, 2 × OCH$_3$)

6.17 (6H, s, 2 × OCH$_3$)

6.48 (3H, s, 17-OCH$_3$)

EXAMPLE 11

28 mg. of metal sodium was dissolved in 25 ml. of anhydrous methanol, and one droplet of water was added thereto, and 800 mg. of methylreserpate 3'-ethoxycarboxy-4'-methoxycinnamate in 25 ml. of tetrahydrofuran was added thereto. The mixture was then stirred at room temperature for 2 hours. One drop of acetic acid was added thereto, and the solvent was evaporated. The residue was extracted with chloroform, and the extract was washed with saturated sodium bicarbonate solution and then with water. The chloroform layer was dried over sodium sulfate, and the solvent was evaporated, so that there was obtained a brown amorphous matter. This was recrystallized from chloroformhexane, and there was then obtained 450 mg. (64% of yield) of methylreserpate 3'-hydroxy-4'-methoxycinnamate represented by the following formula, which was characterized as a pale yellow powder having a melting point of 162° to 164°C.:

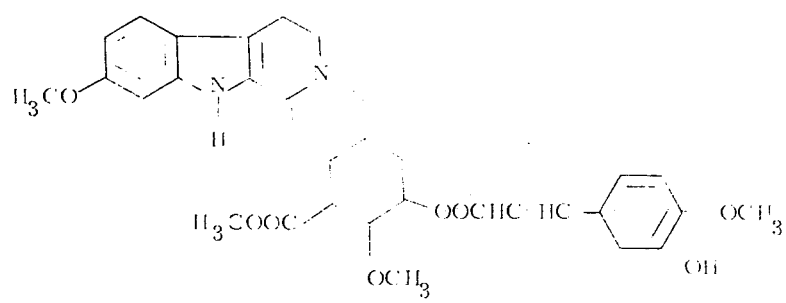

EXAMPLE 12

Using 1.5 g. of methylreserpate 3'-methoxy-4'-ethoxycarboxycinnamate, the same procedure of Example 11 was repeated under the same reaction conditions, and there was obtained 1.0 g. (78% of yield) of methylreserpate 3'-methoxy-4'-hydroxycinnamate represented by the following formula, which was characterized as pale yellow needles having a melting point of 259° to 260°C.:

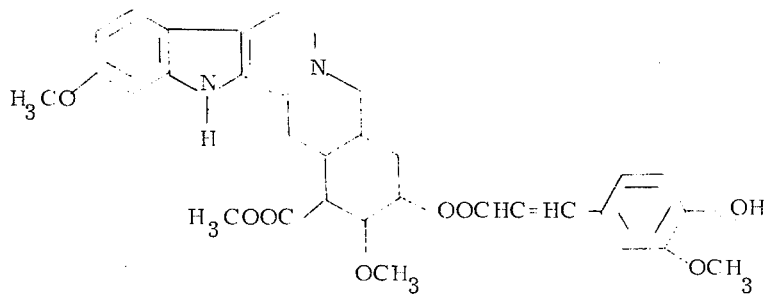

Having now fully described the invention, it will be apparent to one of ordinary skill in the art that many changes and modifications can be made thereto without departing from the spirit or scope of the invention as set forth herein. Accordingly,

What is claimed and desired to be secured by Letters Patent is:

1. Methylreserpate 3',4'-dimethoxycinnamate.
2. A compound of the formula:

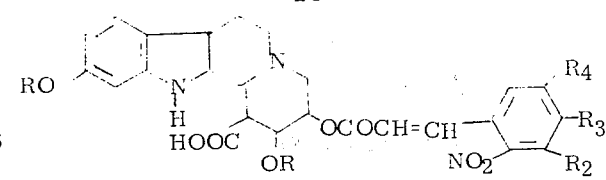

wherein R represents lower alkyl; $R_2$ and $R_3$ each represent hydrogen, hydroxy, lower alkoxy, benzyloxy or alkoxycarboyx; $R_4$ represents hydrogen or lower alkoxy; or $R_2$ and $R_3$ taken together or $R_3$ and $R_4$ taken together may jointly form a methylenedioxy group.

3. Methylreserpate 2'-nitro-3',4',5'-trimethoxycinnamate.

4. Methylreserpate 3'-methoxy-4'-hydroxycinnamate.

* * * * *